A. B. Colton,
Horse Power.

Nº 24,101.          Patented May 24, 1859.

Witnesses;
J. S. Huggins
F. W. Adams

Inventor;
Albert B. Colton

UNITED STATES PATENT OFFICE.

ALBERT B. COLTON, OF ATHENS, GEORGIA.

HORSE-POWER MACHINE.

Specification of Letters Patent No. 24,101, dated May 24, 1859.

*To all whom it may concern:*

Be it known that I, ALBERT B. COLTON, of Athens, in the county of Clark and State of Georgia, have invented a new and Improved Horse-Power; and I do hereby declare that the following is a full, clear, and exact description thereof, reference being had to the accompanying drawings and to the letters of reference marked thereon.

Figure 1:
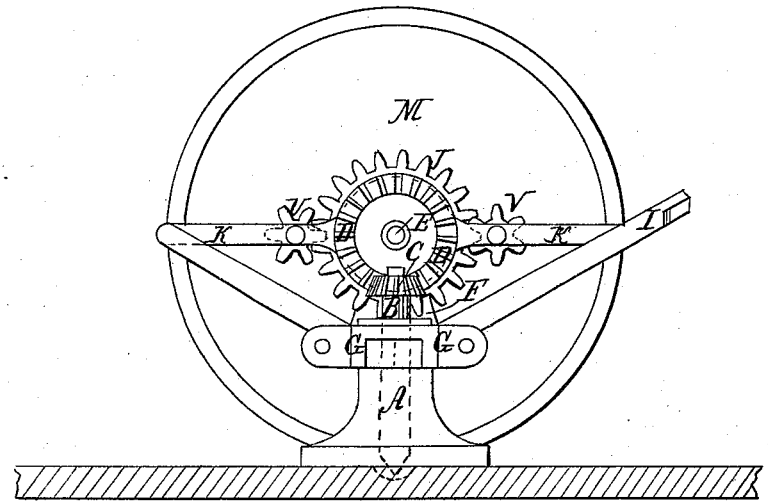
Figure 3:
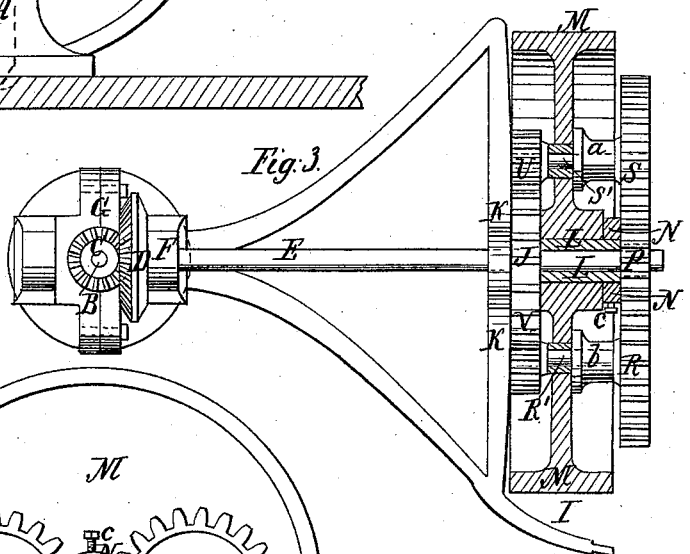
Figure 2:
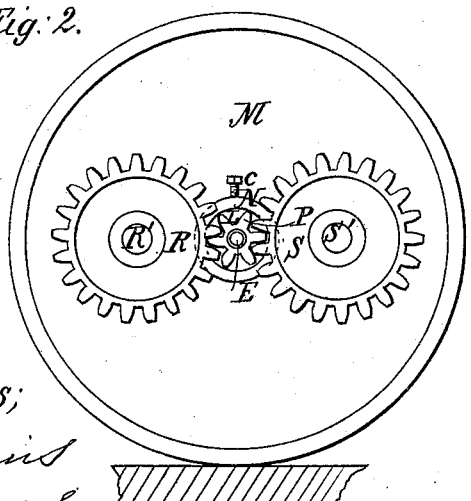

Figure 1 is a front elevation of the arrangement of gearing on one side of the driving wheel. Fig. 2 is a view of the gearing on the opposite side of the same. Fig. 3 is a plan of the gearing, with a section of the driving wheel showing the arrangement of spur wheels on either side of said wheel.

Similar letters of reference indicate like parts in the three figures.

The nature of my invention consists in arranging a stationary driving gear upon a triangular frame placed centrally with the main driving wheel, so that the hub of said gear shall form a bearing or axle for the driving wheel and the bore a bearing for the horizontal pinion shaft; and arranging a series of spur gearing on either side of the main wheel so as to communicate a swift rotary motion to a vertical shaft, from which motion is transmitted by means of belts or otherwise, to actuate any machinery desired, described, represented and specified as follows:

This invention belongs to that class of horse power in which a large driving wheel is employed, and where the horse travels in a circular path the wheel following in the track of the horse, or nearly so, and described as follows:—

A is a hollow pedestal which is rigidly bolted to a floor, or to beams fixed in the ground, through this pedestal passes a vertical spindle, B, having keyed to its upper end a bevel pinion, C, the teeth of which take into a bevel wheel, D, fixed to a horizontal shaft, E, having its bearings in a vertical post, F. This post forms part of a yoke, G, which encompasses an annular slot near the top of the pedestal, A. This yoke, G, is formed of two parts and put together by bolts or screws so as to be readily detached from the pedestal in taking the machine to pieces, which arrangement renders it very portable. The lever is composed of three pieces put together in a triangular shape and secured to the yoke by bolts or otherwise. To the center of the cross-brace, K, is secured a spur wheel, J, having a hollow hub, L, through which passes the horizontal shaft, E. Upon this hub, L, is placed the large driving wheel, M, and upon that portion of the hub which projects beyond the side of the driving wheel is fixed an annular collar, N, which, can be removed by unscrewing set-screw $c$ in order to detach the wheel from the hub.

On the end of the horizontal shaft, E, is keyed a pinion wheel, P, which is actuated by gear wheels, R S, fixed to short shafts, R' S', having their bearings in journal boxes, $a$ $b$, and passing through the wheel where they receive pinions, U V, which, respectively take into teeth upon the stationary wheel, J, and impart a rapid rotary motion to the pinion, P, and horizontal shaft, E, as the driving wheel revolves, the horse being attached to the projecting arm, I, of the lever in front of said wheel.

The operation of this machine may be described as follows:—The horse being attached to the projecting arm, I, of the lever, revolves the large driving wheel, M. The wheel, J, which is fixed to the cross-brace, being stationary with respect to the driving wheel, actuates the pinions, U V, which roll around the surface of this wheel, J, these pinions actuate two large wheels, R S, being keyed to the same shafts which revolve around the pinion, P, and transmit the rotary motion from pinions, U V, to this pinion whose shaft passes through the axis of the driving wheel, M, and through that of the stationary wheel, J, and having its bearings in a post, F, it actuates the vertical spindle, B, by means of bevel wheels, D, and pinions, C, as above described, these being situated in the center of the circle in which the horse travels.

What I claim as new and desire to secure by Letters Patent is:—

1. The stationary wheel, J, and its hub, L, when the same are placed centrally with the large driving wheel, M, for giving motion to the pinions, U V, and gear wheels, R S, revolving with the driving wheel, M, so as to impart a rapid rotary motion to the horizontal shaft, E, having its bearings in the axes of both driving wheels M, and stationary wheel J, all arranged in the manner and for the purpose herein specified.

2. I claim the section yoke, G, as herein described, in combination with the annular collar, N, and set screws, c, arranged in the manner and for the purposes herein shown.

ALBERT B. COLTON.

Witnesses:
I. I. HUGGINS,
F. W. ADAMS.